(12) United States Patent
Miyata

(10) Patent No.: US 9,380,185 B2
(45) Date of Patent: Jun. 28, 2016

(54) MEDIUM HAVING INSTRUCTIONS FOR STORING AND DISPLAYING IMAGE DATA ON AN OUTPUT APPARATUS BASED ON ATTRIBUTES, AND OUTPUT APPARATUS FOR STORING AND DISPLAYING IMAGE DATA BASED ON ATTRIBUTES

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/014,708

(22) Filed: Aug. 30, 2013

(65) Prior Publication Data

US 2014/0063560 A1 Mar. 6, 2014

(30) Foreign Application Priority Data

Aug. 31, 2012 (JP) .................................. 2012-191925

(51) Int. Cl.
*H04N 1/32* (2006.01)

(52) U.S. Cl.
CPC ....... *H04N 1/32144* (2013.01); *H04N 1/32122* (2013.01); *H04N 1/32128* (2013.01); *H04N 1/32464* (2013.01); *H04N 2201/3225* (2013.01); *H04N 2201/3273* (2013.01); *H04N 2201/3277* (2013.01); *H04N 2201/3288* (2013.01)

(58) Field of Classification Search
CPC .............. G06F 17/30864; G06F 17/30; G06F 17/30011; G06F 17/30619; G06F 17/716
USPC .......... 358/1.9, 2.1, 1.13, 1.16, 403; 382/101; 707/661, 665, 673, 711, 828, 829, 830
See application file for complete search history.

(56) References Cited

U.S. PATENT DOCUMENTS

| | | | | | |
|---|---|---|---|---|---|
| 4,408,181 | A | * | 10/1983 | Nakayama | .................... 382/306 |
| 4,965,558 | A | * | 10/1990 | Saki et al. | ...................... 345/156 |
| 5,172,245 | A | * | 12/1992 | Kita | ..................... H04N 1/2175 345/418 |
| 5,581,752 | A | * | 12/1996 | Inoue et al. | ................... 715/209 |
| 5,857,185 | A | * | 1/1999 | Yamaura | |
| 2001/0007980 | A1 | * | 7/2001 | Ishibashi | ............... G06F 1/1626 705/14.4 |
| 2009/0046330 | A1 | | 2/2009 | Watanabe | |
| 2011/0173188 | A1 | * | 7/2011 | Walsh et al. | .................. 707/722 |

FOREIGN PATENT DOCUMENTS

| | | |
|---|---|---|
| JP | H07-131601 A | 5/1995 |
| JP | 2000-341470 A | 12/2000 |
| JP | 2009-049571 A | 3/2009 |

* cited by examiner

*Primary Examiner* — Jamares Q Washington
(74) *Attorney, Agent, or Firm* — Merchant & Gould P.C.

(57) ABSTRACT

Computer-executable instructions stored in a medium cause an output apparatus to perform first and second output control processes. The output apparatus includes a storage section for storing a plurality of document data sets having a predetermined order and acquired from a plurality of documents, and an output section for outputting images of a plurality of document data constituting the plurality of document data sets. In the first output control process, the output section outputs an image of a document data belonging to one document data set and to output an image of a document data belonging to the next document data set according to the predetermined order. In the second output control process, the output section outputs an image of a document data belonging to a specified attribute of one document data set and to output the next image based on the attribute.

13 Claims, 12 Drawing Sheets

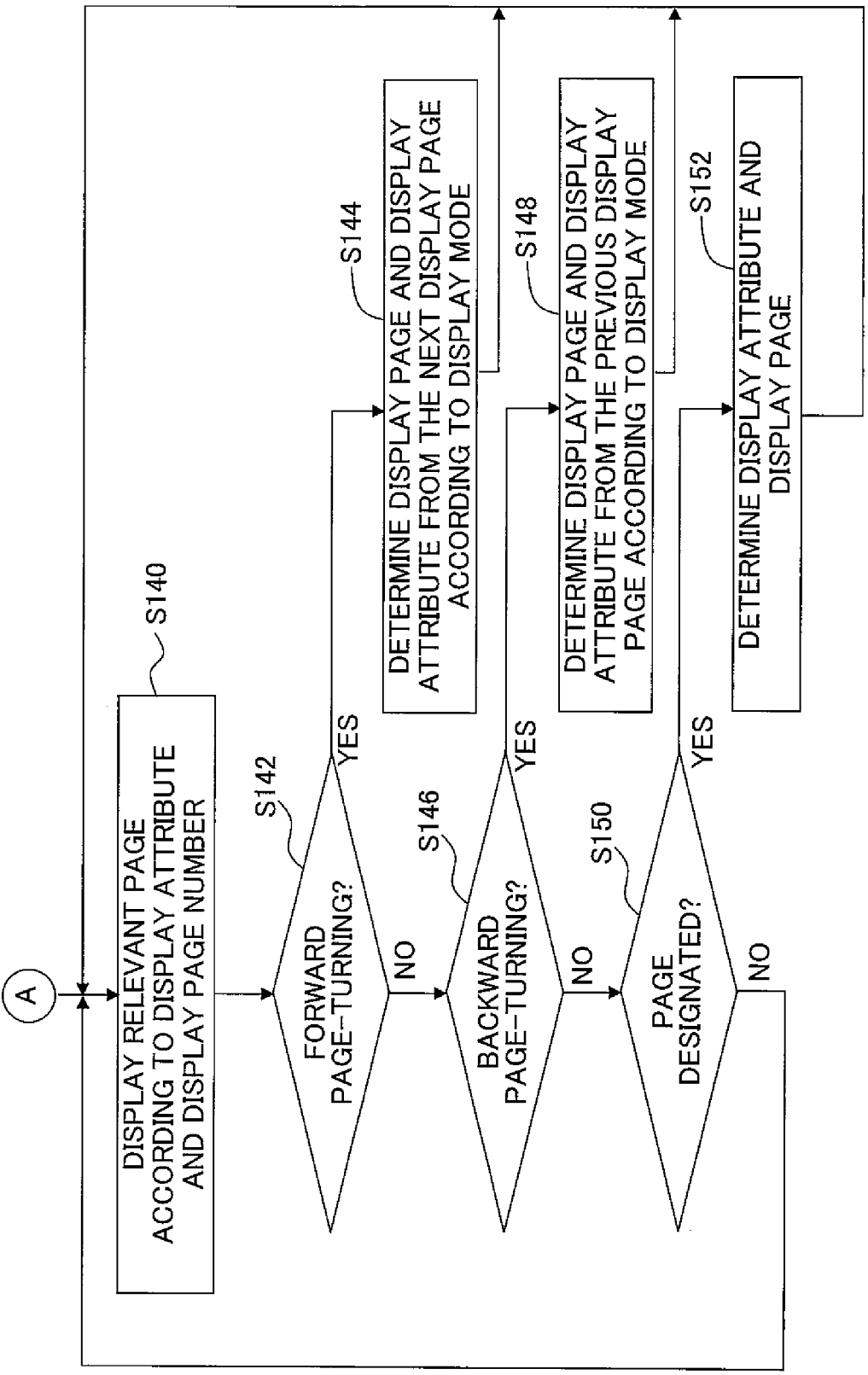

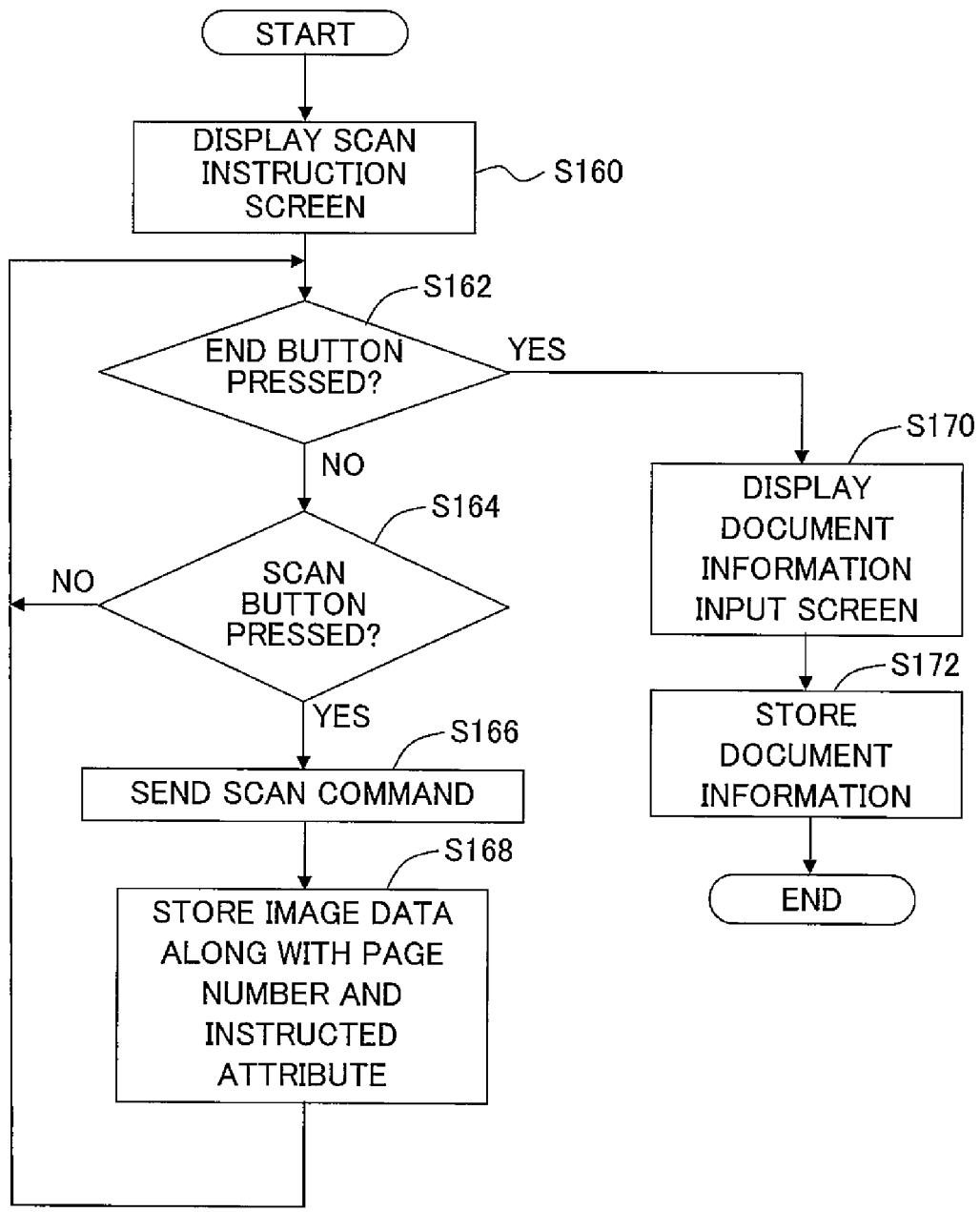

MEDIUM HAVING INSTRUCTIONS FOR STORING AND DISPLAYING IMAGE DATA ON AN OUTPUT APPARATUS BASED ON ATTRIBUTES, AND OUTPUT APPARATUS FOR STORING AND DISPLAYING IMAGE DATA BASED ON ATTRIBUTES

CROSS REFERENCE TO RELATED APPLICATION

The present application claims priority from Japanese Patent Application No. 2012-191925, filed on Aug. 31, 2012, the disclosure of which is incorporated herein by reference in its entirety.

BACKGROUND OF THE INVENTION

1. Field of the Invention

The present invention relates to a medium storing instructions for an output apparatus to output images based on document data, and the output apparatus.

2. Description of the Related Art

Japanese Patent Application Laid-Open No. 07-131601 discloses a technique for acquiring a document data through scanning or the like, and outputting images based on the document data to an output apparatus. With this technique, if a user inputs a keyword, then images are outputted according to the inputted keyword. By virtue of this, the user is able to view the images according to the keyword, thereby improving the operability of the apparatus.

There are documents which are the source of document data, and which may be composed of a plurality of volumes such as, in particular, those composed of two volumes, those composed of ten volumes from volume 1 to volume 10, etc. That is, sometimes a plurality of documents are sequenced or arranged according to a particular sequence. When outputting such sequenced plurality of documents to an output apparatus, the operability of the apparatus may be improved by trying various measures. Especially, if each of the documents is constituted by a plurality of attributes such as, in particular, the cover, table of contents, body text, etc., then the operability of the apparatus may be improved by trying various measures. The present invention is made in view of such kind of situations, and an object thereof is to provide a technique capable of improving the operability of apparatuses for outputting images based on document data.

SUMMARY OF THE INVENTION

According to a first aspect of the present invention, there is provided a non-transitory computer-readable medium storing computer-executable instructions that, when executed by a processor, cause an output apparatus, which includes a storage section configured to store a plurality of document data sets having a predetermined order and acquired from a plurality of documents and an output section configured to output images of a plurality of document data constituting the plurality of document data sets, to perform: a first output control process of controlling the output section to output an image of a document data belonging to one document data set among the plurality of document data sets and, thereafter, output an image of a document data belonging to the next document data set according to the predetermined order of the plurality of document data sets; and a second output control process of controlling the output section to output an image of a document data belonging to a specified attribute of one document data set among the plurality of document data sets and, thereafter, output the next image based on the attribute, each of the plurality of document data sets having a plurality of attributes including the specified attribute, wherein the storage section is configured to store each of the plurality of document data sets in a state that each of the plurality of document data sets is sectioned by the plurality of attributes.

According to a second aspect of the present invention, there is provided an output apparatus including: a storage section configured to store a plurality of document data sets having a predetermined order and acquired from a plurality of documents; an output section configured to output images of a plurality of document data constituting the plurality of document data sets; and a controller configured to perform: a first output control process of controlling the output section to output an image of a document data belonging to one document data set among the plurality of document data sets and, thereafter, output an image of a document data belonging to the next document data set according to the predetermined order of the plurality of document data sets; and a second output control process of controlling the output section to output an image of a document data belonging to a specified attribute of one document data set among the plurality of document data sets and, thereafter, output the next image based on the attribute, each of the plurality of document data sets having a plurality of attributes including the specified attribute, wherein the storage section is configured to store each of the plurality of document data sets in a state that each of the plurality of document data sets is sectioned by the plurality of attributes.

According to the instruction stored in the storage medium of the present invention, the output section outputs images of document data belonging to one document data set and, thereafter, the output section outputs images of document data belonging to the next document data set following the one document data set. Further, the output section outputs an image of a document data belonging to a specified attribute constituting one document data set and, thereafter, the output section outputs the next image based on the attribute. That is, the following two image display methods are adopted: a method of displaying images according to each document data set, and a method of displaying an image according to each attribute. This enables a user to select arbitrarily from the two methods, thereby improving the operability of the apparatus.

BRIEF DESCRIPTION OF THE DRAWINGS

FIGS. 6A and 6B are a flowchart showing operations of the cellular phone for displaying and changing an image on the panel.

FIG. 8 is a flowchart showing operations of a cellular phone according to a second embodiment of the present invention.

DESCRIPTION OF THE PREFERRED EMBODIMENTS

A First Embodiment

Figure 1:
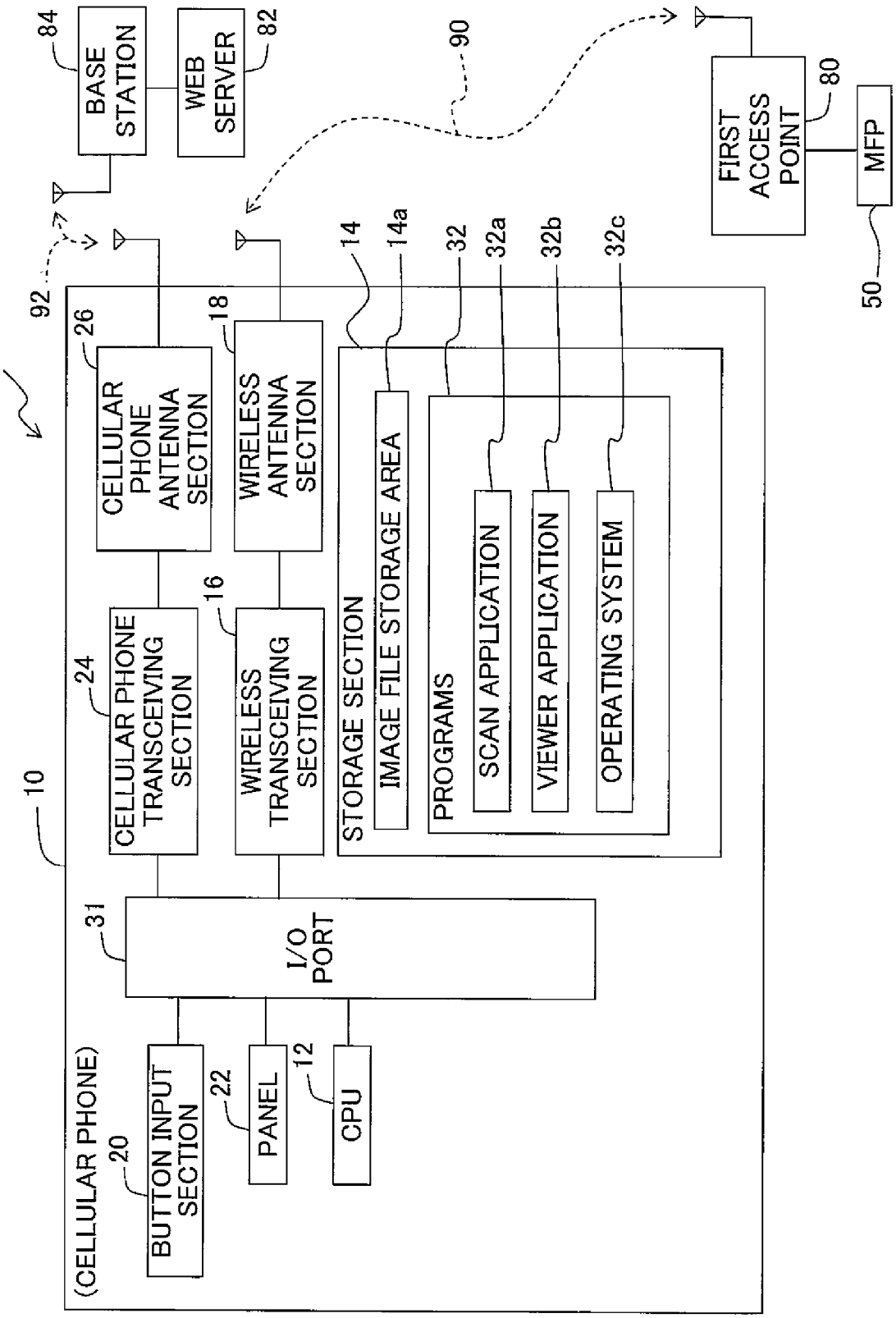
FIG. 1 is a block diagram of a communication system according to a first embodiment of the present invention.

As shown in FIG. 1, a communication system 1 includes a cellular phone 10, an MFP (the abbreviation for Multifunction Peripheral) 50, a first access point 80, a web server 82, and a base station 84. The cellular phone 10 and the MFP 50 are provided with a function of a known wireless LAN terminal device. Further, the MFP 50 is a multifunction peripheral provided with a printer function, scanner function, photocopy function, facsimile function, etc. The first access point 80 is provided with a function of a known wireless LAN access point. The web server 82 is a device configured to provide its own functions and data to client devices via a network.

Further, the cellular phone 10 and the first access point 80 are configured to be capable of carrying out a wireless communication (a data communication using radio wave) 90 complying with the infrastructure mode of a wireless LAN method (the mode in which a plurality of wireless LAN terminal devices carry out data communications via an access point). That is, if the cellular phone 10 is in such a state as is able to access the first access point 80 to carry out the wireless communication 90 complying with the infrastructure mode of wireless LAN, then it can carry out a data communication with the MFP 50 via the first access point 80. Further, examples of the wireless LAN method may include, for instance, communication methods prescribed by the standard of IEEE802.11a/b/g/n.

Next, a configuration of the cellular phone 10 will be explained. The cellular phone 10 primarily includes a CPU (the abbreviation for Central Processing Unit) 12, a storage section 14, a wireless transceiving section 16, a wireless antenna section 18, a button input section 20, a panel 22, a cellular phone transceiving section 24, and a cellular phone antenna section 26.

The CPU 12 carries out processes according to an aftermentioned program 32 in the storage section 14. Hereinbelow, sometimes a program name, such as scan application 32a, viewer application 32b or the like, may also be simply used to refer to the CPU 12 which executes the program. For example, the expression "the scan application 32a" may sometimes mean "the CPU 12 which executes the scan application 32a".

The wireless transceiving section 16 carries out the wireless communication 90 complying with the infrastructure mode of wireless LAN via the wireless antenna section 18. Further, the cellular phone transceiving section 24 carries out a wireless communication 92 complying with a method of cellular phone communication between itself and the base station 84 via the cellular phone antenna section 26. Then, digital signals constituting various data are sent and received by the wireless transceiving section 16, cellular phone transceiving section 24, and the like.

The storage section 14 is constructed by combining RAM (the abbreviation for Random Access Memory), ROM (the abbreviation for Read Only Memory), flash memory, HDD (the abbreviation for Hard Disk Drive), the buffer included in the CPU 12, etc.; and the storage section 14 stores the program 32. The program 32 includes the scan application 32a, the viewer application 32b, and an operating system 32c. It is possible to use the cellular phone 10 to cause the MFP 50 to carry out a scanning process by letting the CPU 12 of the cellular phone 10 execute the scan application 32a. The viewer application 32b is configured for causing the CPU 12 to carry out a process of displaying, on the panel 22, images based on the image data stored in an aftermentioned image file storage area 14a.

The operating system 32c is a program which provides basic functions to be used by the scan application 32a and viewer application 32b. The operating system 32c includes a program for causing the cellular phone transceiving section 24 to make telephone calls, a program for causing the wireless transceiving section 16 to carry out the wireless communication 90, etc.

Further, the storage section 14 includes the image file storage area 14a. The image file storage area 14a serves to store a plurality of image files. An example of the image files may be presented by an image file which includes the image data of a plurality of manuscripts scanned by the MFP 50.

The panel 22 includes a display screen configured to display various functions of the cellular phone 10. The button input section 20 has a touch sensor and is constructed integrally with the panel 22 to detect an input medium approaching or touching the panel 22, and to accept a user's button manipulations.

<Operations of the Cellular Phone>

Figure 2:
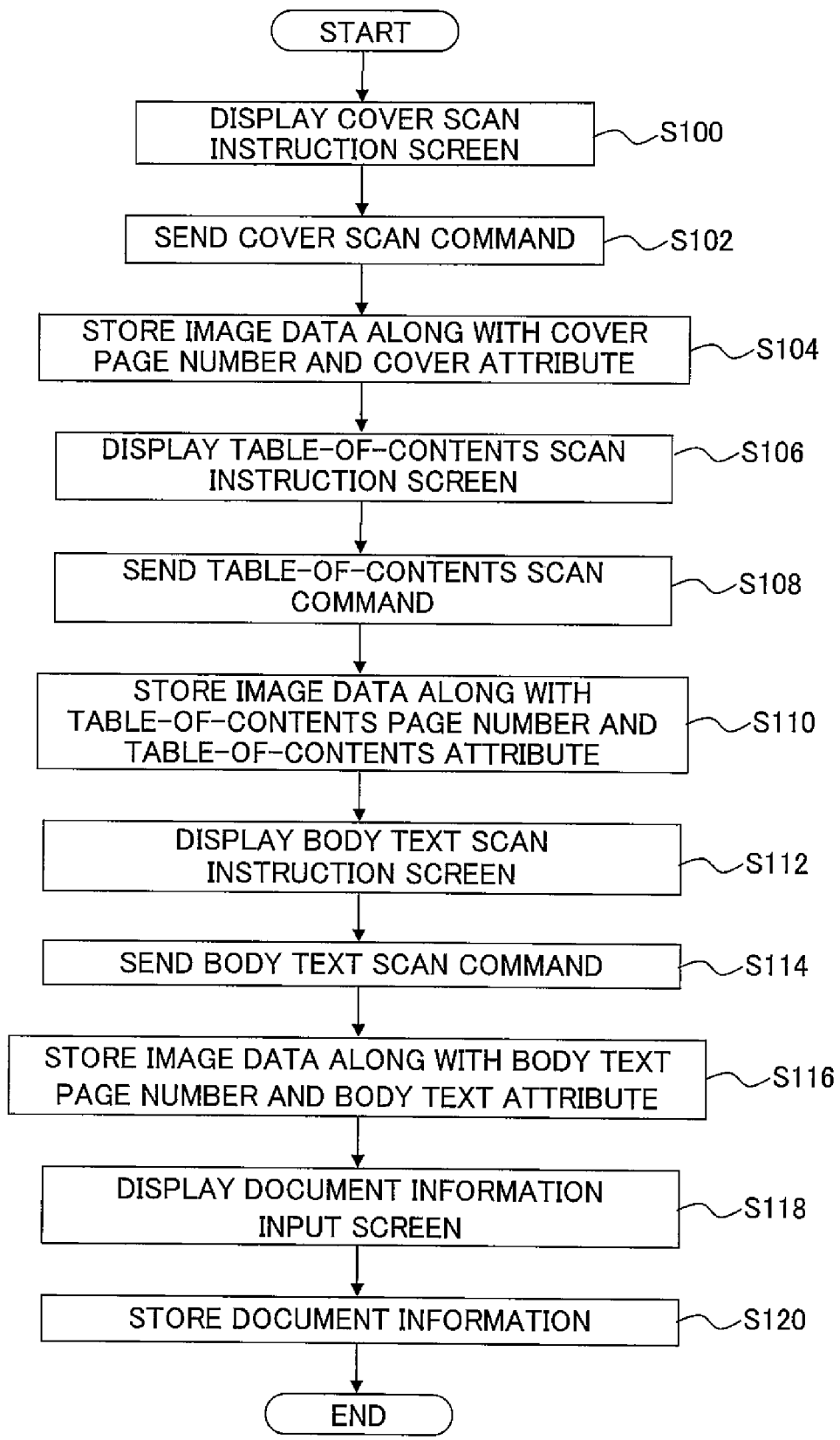
FIG. 2 is a flowchart showing operations of a cellular phone for acquiring image data.

Next, operations of the cellular phone 10 according to the first embodiment will be explained. The cellular phone 10 uses the scan application 32a to carry out a process for acquiring image data of a plurality of manuscripts read out or scanned by a scanner of the MFP 50. Further, the plurality of manuscripts constitute a document, which has a plurality of attributes such as the cover, table of contents, and body text, while the image data are acquired according to each of these plurality of attributes. Referring to FIG. 2, a flow will be explained in particular for acquiring the image data according to each of the plurality of attributes.

Figure 3A:
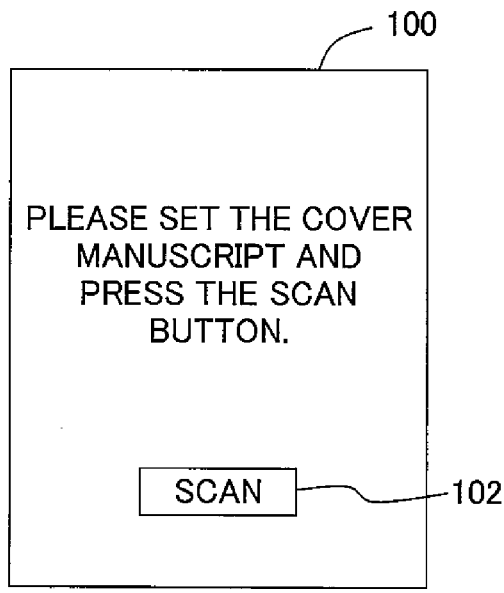
FIGS. 3A and 3B show screens displayed on a panel by executing a scan application.

In S100, the CPU 12 displays a cover scan instruction screen 100 shown in FIG. 3A on the panel 22. Then, the process proceeds to S102. The cover scan instruction screen 100 is configured for scanning the manuscript whose attribute is the cover (to be referred to hereinbelow as "manuscript of the cover"), and a scan button 102 is displayed thereon.

In S102, if the scan button 102 is pressed down, then the CPU 12 sends a scan processing command to the MFP 50 for acquiring the image data of the manuscript of the cover. On accepting the command, the MFP 50 scans the manuscript of the cover set on the platen, and generates an image data of the manuscript of the cover. Then, the process proceeds to S104.

Figure 4:
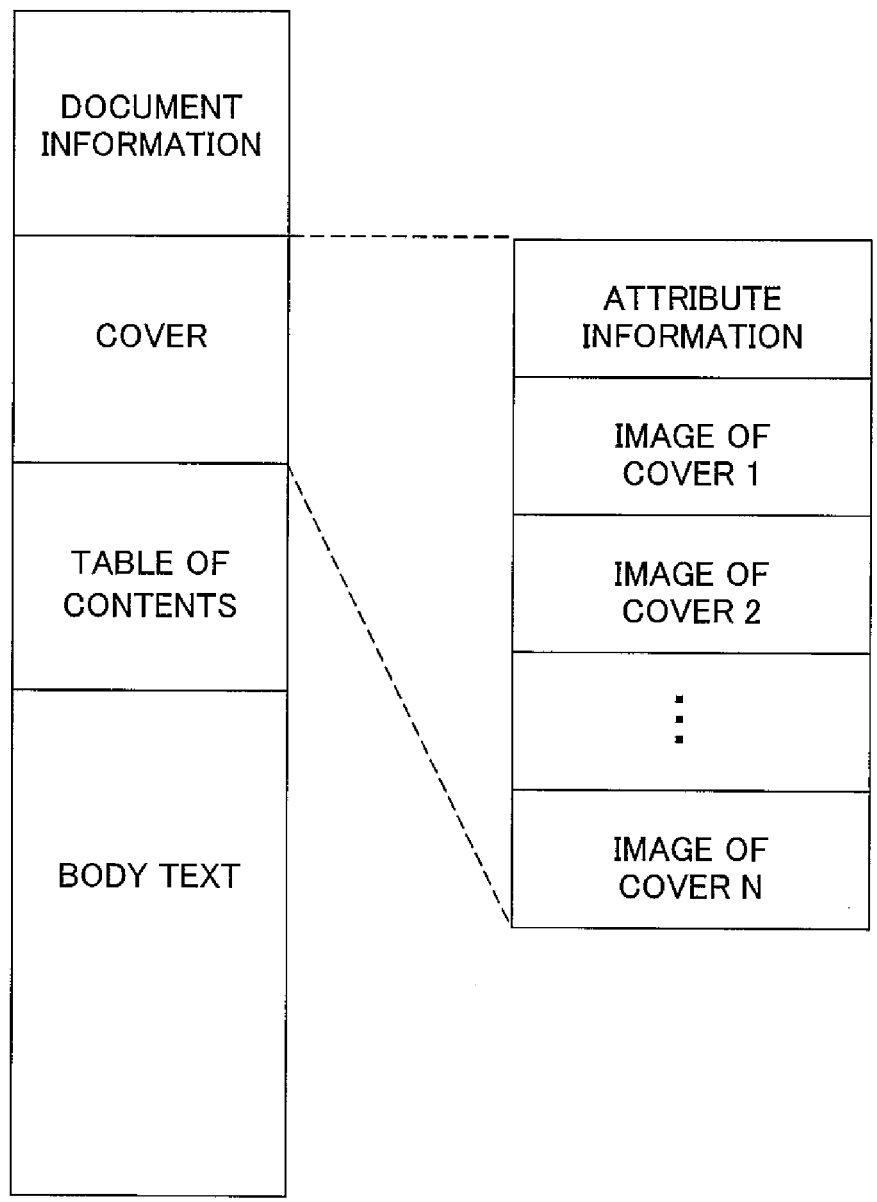
FIG. 4 conceptually shows an image data acquired by executing the scan application.

In S104, the CPU 12 acquires the image data of the manuscript of the cover from the MFP 50, and lets the image file storage area 14a store the acquired image data. On this occasion, the CPU 12 lets the image file storage area 14a store the image data associated with the attribute information and page number. In detail, as the data related to the manuscript of the cover as shown in FIG. 4, the image file storage area 14a stores the data related to the attribute information, and a plurality of image data to each of which a page number is assigned. Then, the process proceeds to S106.

In S106, the CPU 12 displays a table-of-contents scan instruction screen (not shown) on the panel 22. Then, the process proceeds to S108. The table-of-contents scan instruction screen is configured for scanning the manuscript whose attribute is the table of contents (to be referred to hereinbelow as "manuscript of the table of contents") and, similar to the cover scan instruction screen 100, a scan button is displayed thereon.

In S108, if the scan button of the table-of-contents scan instruction screen is pressed down, then the CPU 12 sends a scan processing command to the MFP 50 for acquiring the image data of the manuscript of the table of contents. On accepting the scan processing command, the MFP 50 scans the manuscript of the table of contents set on the platen, and generates an image data of the manuscript of the table of contents. Then, the process proceeds to S110.

In S110, the CPU 12 acquires the image data of the manuscript of the table of contents from the MFP 50, and lets the image file storage area 14a store the acquired image data. On this occasion, the CPU 12 lets the image file storage area 14a store the image data associated with the attribute information and page number. In detail, like the data related to the manuscript of the cover, as the data related to the manuscript of the table of contents, the image file storage area 14a stores the data related to the attribute information, and a plurality of image data to each of which a page number is assigned. Then, the process proceeds to S112.

In S112, the CPU 12 displays a body text scan instruction screen (not shown) on the panel 22. Then, the process proceeds to S114. The body text scan instruction screen is configured for scanning the manuscript whose attribute is the body text (to be referred to hereinbelow as "manuscript of the body text") and, similar to the cover scan instruction screen 100, a scan button is displayed thereon.

In S114, if the scan button of the body text scan instruction screen is pressed down, then the CPU 12 sends a scan processing command to the MFP 50 for acquiring the image data of the body text. In response to the acceptance of the command, the MFP 50 scans the manuscript of the body text set on the platen, and generates an image data of the manuscript of the body text. Then, the process proceeds to S116.

In S116, the CPU 12 acquires the image data of the manuscript of the body text from the MFP 50, and lets the image file storage area 14a store the acquired image data. On this occasion, the CPU 12 lets the image file storage area 14a store the image data associated with the attribute information and page number. In detail, like the data related to the manuscript of the cover, as the data related to the manuscript of the body text, the image file storage area 14a stores the data related to the attribute information, and a plurality of image data to each of which a page number is assigned. Then, the process proceeds to S118.

Figure 3B:
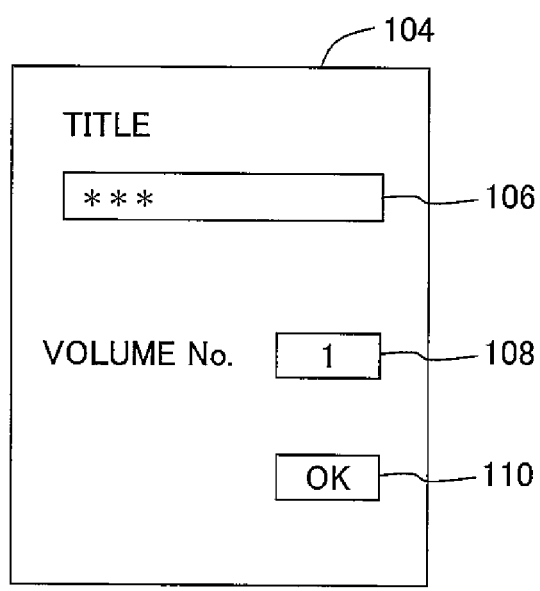

In S118, the CPU 12 displays a document information input screen 104 shown in FIG. 3B (on the panel 22). The document information input screen 104 is configured for inputting information related to the document, and a title input box 106, a volume number input box 108, and an OK button 110 are displayed thereon.

The title input box 106 is configured for inputting the title of a document. The volume number input box 108 is configured for inputting a sequence number when a plurality of documents are ordered. For example, if a two-volume novel composed of first and second volumes is adopted as two documents to be scanned, then "1" is inputted to the volume number input box 108 for inputting document information of the first volume of the novel, whereas "2" is inputted to the volume number input box 108 for inputting document information of the second volume of the novel. The OK button 110 is a button to be manipulated after finishing the input on the document information input screen 104, and manipulating the OK button 110 leads the process to proceed to S120.

In S120, the CPU 12 lets the image file storage area 14a store the document information inputted to the document information input screen 104. By virtue of this, the image data are acquired from one document sectioned according to each of the plurality of attributes, and these plurality of image data are stored with the information related to the document being the source of the plurality of image data. In particular, the image data related to one document is, as shown in FIG. 4, divided into the image data related to the manuscript of the cover, the image data related to the manuscript of the table of contents, and the image data related to the manuscript of the body text, while the image data related to those three attributes are stored in association with the data related to the document information. The image file storage area 14a stores the data set composed of each image data and the data related to the document information with respect to any one document, according to each document. The data set of each document is also referred to as document data set. The image data related to the manuscript of the cover, the image data related to the manuscript of the table of contents, and the image data related to the manuscript of the body text are also referred to as the image data of the cover, the image data of the table of contents, and the image data of the body text, respectively. The set of a plurality of image data of the cover, the set of a plurality of image data of the table of contents, and the set of a plurality of image data of the body text, all of which are included in one document data set and to each of which a page number is assigned, are also referred to as the image data set of the cover, the image data set of the table of contents, and the image data set of the body text, respectively.

The viewer application 32b is used to display, on the panel 22, the images based on the image data acquired in the above manner, and a page-turning manipulation sequentially changes the images displayed on the panel 22. The cellular phone 10 is provided with three modes for changing the images by the page-turning manipulation, and it is possible to select one mode from these three modes.

The three modes provided are a conjunct mode, a separate mode, and a body text mode. Hereinbelow, an explanation will be given about each mode for the case that a plurality of image data sets of three consecutive documents, for example, a three-volume novel composed of first, second and third volumes are stored in the image file storage area 14a through the aforementioned scanning process.

Figure 5A:
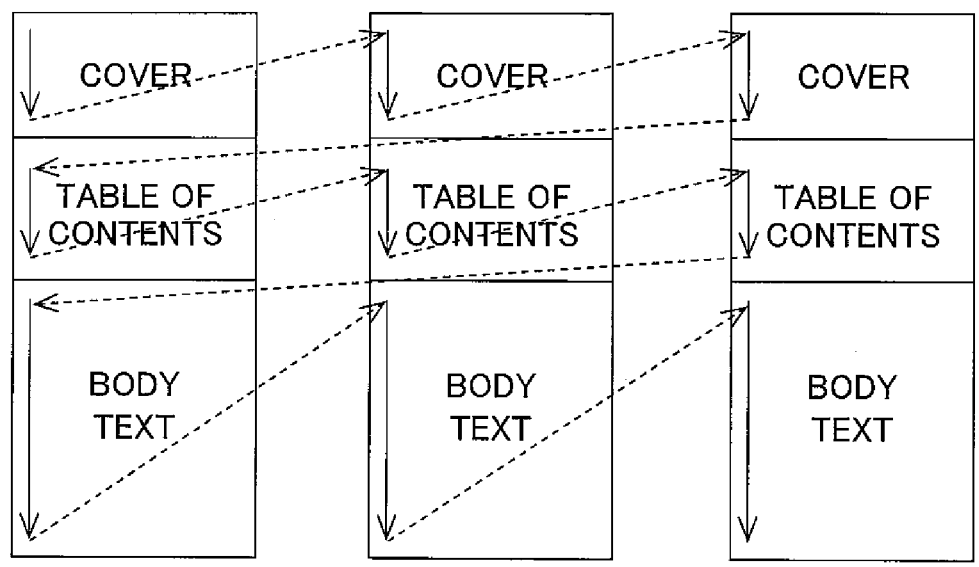
FIGS. 5A to 5C conceptually show a display method for displaying the image data on the panel.

In the conjunct mode as shown in FIG. 5A, first, images of a plurality of image data belonging to a cover attribute of the first volume are displayed sequentially according to the page order within the cover attribute of the first volume. Next, following the image of the last page in the cover attribute of the first volume, images of a plurality of image data belonging to the cover attribute of the second volume, which is ordered after the first volume, are displayed sequentially according to the page order within the cover attribute of the second volume. Then, following the image of the last page in the cover attribute of the second volume, images of a plurality of image data belonging to the cover attribute of the third volume, which is ordered after the second volume, are displayed sequentially according to the page order within the cover attribute of the third volume. There is no document data set ordered after the third volume. Therefore, following the image of the last page in the cover attribute of the third volume, among the images of the first volume, images of a plurality of image data belonging to a table of contents attribute, which is the next attribute to the cover attribute, are displayed sequentially according to the page order within the table of contents attribute of the first volume. Then, following the image of the last page in the table of contents attribute of the first volume, images of a plurality of image data belonging to the table of contents attribute of the second volume are displayed sequentially according to the page order within the table of contents attribute of the second volume. Then, following the image of the last page in the table of contents attribute of the second volume, images of a plurality of image data belonging to the table of contents attribute of the third volume are displayed sequentially according to the page order within the table of contents attribute of the third volume. Then, following the image of the last page in the table of contents attribute of the third volume, among the images of the first volume, images of a plurality of image data belonging to a body text attribute, which is the next attribute to the table of contents attribute, are displayed sequentially according to the page order within the body text attribute of the first volume. Then, following the image of the last page in the body text attribute of the first volume, images of a plurality of image data belonging to the body text attribute of the second volume are displayed sequentially according to the page order within the body text attribute of the second volume. Then, following the image of the last page in the body text attribute of the second volume, images of a plurality of image data belonging to the body text attribute of the third volume are displayed sequentially according to the page order within the body text attribute of the third volume.

Figure 5B:
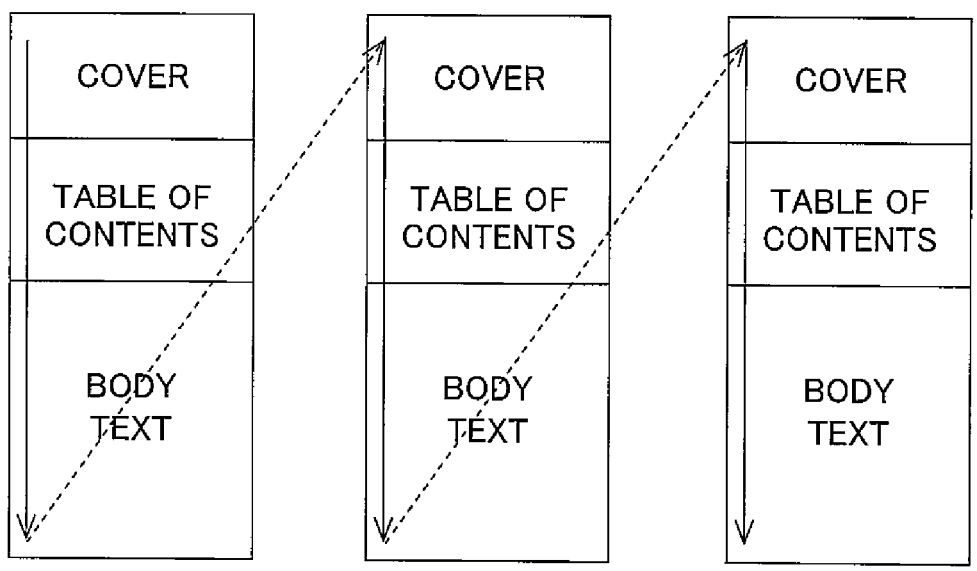

In the separate mode as shown in FIG. 5B, first, images of a plurality of image data belonging to the cover attribute of the first volume are displayed sequentially according to the page order within the cover attribute of the first volume. Next, following the image of the last page in the cover attribute of the first volume, among the images of the first volume, images of a plurality of image data belonging to the table of contents attribute, which is next attribute to the cover attribute, are displayed sequentially according to the page order within the table of contents attribute of the first volume. Following the image of the last page in the table of contents attribute of the first volume, among the images of the first volume, images of a plurality of image data belonging to the body text attribute, which is next attribute to the table of contents attribute, are displayed sequentially according to the page order within the body text attribute of the first volume. There is no attribute next to the body text attribute in the first volume. Therefore, following the image of the last page in the body text attribute of the first volume, among the images of the second volume, images of a plurality of image data belonging to the cover attribute of the second volume are displayed sequentially according to the page order within the cover attribute of the second volume. Following the image of the last page in the cover attribute of the second volume, images of a plurality of image data belonging to the table of contents attribute of the second volume are displayed sequentially according to the page order within the table of contents attribute of the second volume. Following the image of the last page in the table of contents attribute of the second volume, images of a plurality of image data belonging to the body text attribute of the second volume are displayed sequentially according to the page order within the body text attribute of the second volume. Then, following the image of the last page in the body text attribute of the second volume, among the images of the third volume, images of a plurality of image data belonging to the cover attribute of the third volume are displayed sequentially according to the page order within the cover attribute of the third volume. Following the image of the last page in the cover attribute of the third volume, images of a plurality of image data belonging to the table of contents attribute of the third volume are displayed sequentially according to the page order within the table of contents attribute of the third volume. Following the image of the last page in the table of contents attribute of the third volume, images of a plurality of image data belonging to the body text attribute of the third volume are displayed sequentially according to the page order within the body text attribute of the third volume.

Figure 5C:
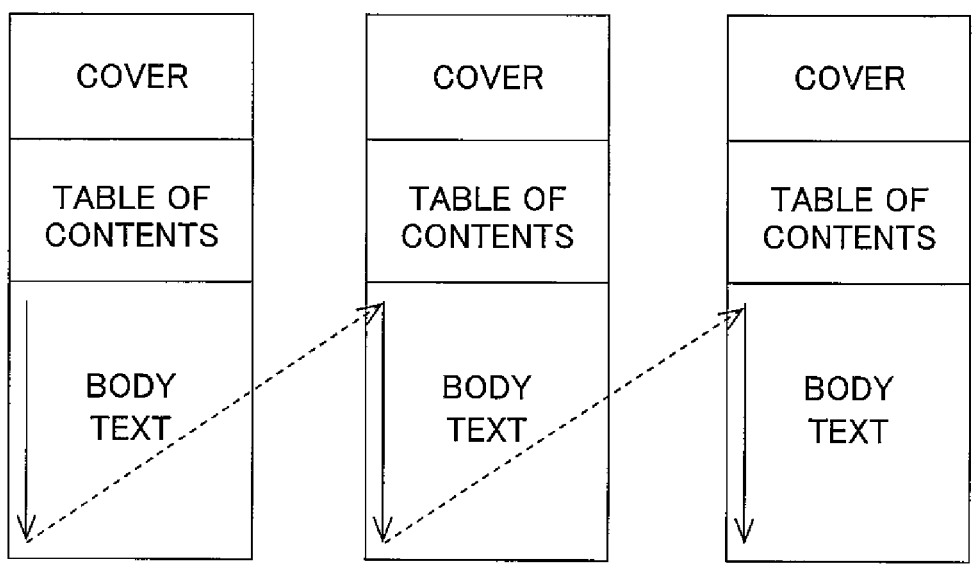

In the body text mode as shown in FIG. 5C, first, images of a plurality of image data belonging to the body text attribute of the first volume are displayed sequentially according to the page order within the body text attribute of the first volume. Next, following the image of the last page in the body text attribute of the first volume, images of a plurality of image data belonging to the body text attribute of the second volume, which is ordered after the first volume, are displayed sequentially according to the page order within the body text attribute of the second volume. Then, following the image of the last page in the body text attribute of the second volume, images of a plurality of image data belonging to the body text attribute of the third volume, which is ordered after the second volume, are displayed sequentially according to the page order within the body text attribute of the third volume.

Figure 6A:
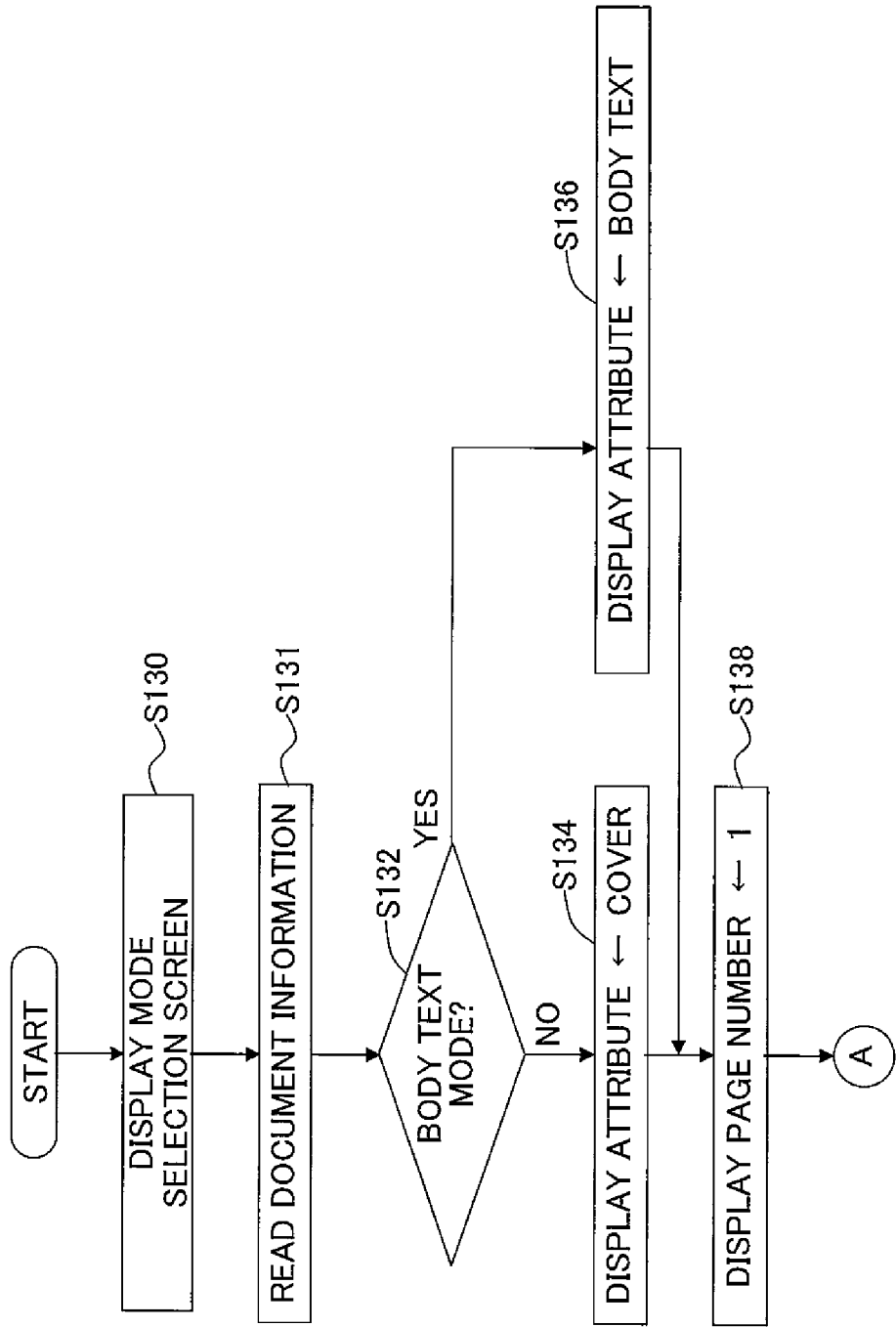

According to any one of the above three modes, images based on the image data are displayed sequentially on the panel 22. Hereinbelow, referring to FIGS. 6A and 6B, a flow will be explained for carrying out the display of the images based on the image data on the panel 22, and the change of the images based on the page-turning manipulation.

Figure 7A:
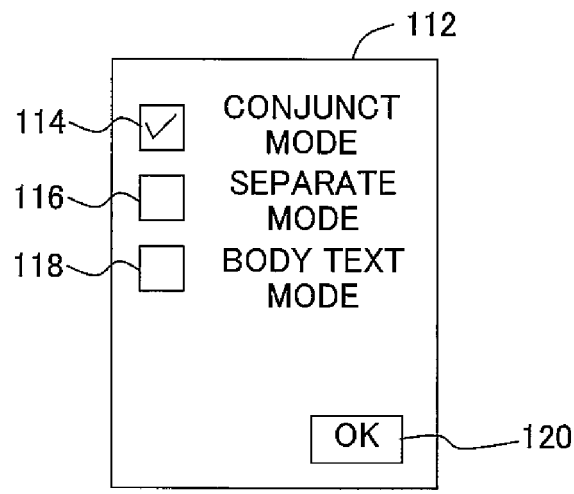
FIGS. 7A to 7C show screens displayed on the panel by executing a viewer application.

In S130, the CPU 12 displays a mode selection screen 112 shown in FIG. 7A. The mode selection screen 112 is configured for selecting one mode from the three modes, and an OK button 120 and three check boxes 114, 116 and 118 are displayed thereon.

The three check boxes 114, 116 and 118 are provided to correspond to the three modes for selecting one mode by placing a check mark into any of the three check boxes 114, 116 and 118. The OK button 120 is a button to be manipulated after finishing the input on the mode selection screen 112, and manipulating the OK button 120 leads the process to proceed to S131.

In S131, the CPU 12 reads in the document information stored in the image file storage area 14*a*. Then, the process proceeds to S132. In S132, the CPU 12 determines whether or not the mode selected in S130 is the body text mode. If the selected mode is not the body text mode (S132: No), then the process proceeds to S134. In S134, the CPU 12 sets a display attribute for the cover. Then, the process proceeds to S138. Incidentally, the display attribute shows an attribute to which the image data, of the images to be displayed on the panel 22, belongs, and the images based on the image data with the display attribute are displayed on the panel 22.

On the other hand, if the selected mode is the body text mode (S132: Yes), then the process proceeds to S136. In S136, the CPU 12 sets the display attribute for the body text. Then, the process proceeds to S138.

In S138, the CPU 12 sets 1 to be the page number for the display on the panel 22. Then, the process proceeds to S140. In S140, the CPU 12 displays the image based on the image data on the panel 22 according to the display attribute and page number. Further, the document information is used in displaying the image. For example, when an image is displayed on the panel 22 for the first time, if the display attribute is set for the cover, then on the panel 22, there is displayed the first page of the cover of the document with the volume number being "1" set in the document information. That is, on the panel 22, there is displayed the initial page of the image data of the cover in the document data set with the volume number being "1".

Figure 7B:
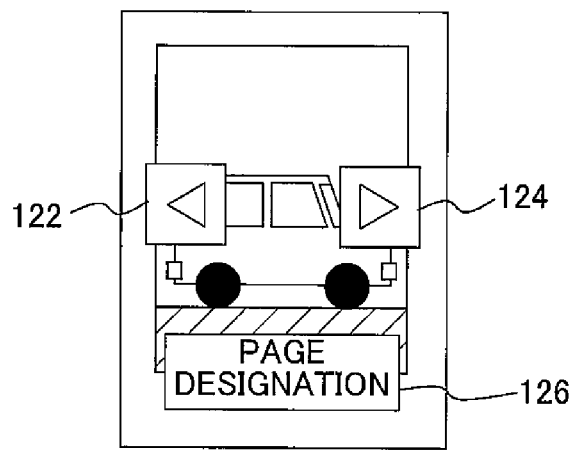

In the image displayed on the panel 22, as shown in FIG. 7B, a backward page-turning button 122, a forward page-turning button 124, and a page designation button 126 are displayed. The backward page-turning button 122 is configured for displaying the image preceding the currently displayed image on the panel 22. The forward page-turning button 124 is configured for displaying the image following the currently displayed image on the panel 22. The page designation button 126 is configured for displaying an aftermentioned page designation screen (see FIG. 7C) on the panel 22 to designate an arbitrary page.

If the image according to the process of S140 is displayed on the panel 22, then the process proceeds to S142. In S142, the CPU 12 determines whether or not the forward page-turning button 124 is manipulated. If the forward page-turning button 124 is manipulated (S142: Yes), then the process proceeds to S144. In S144, the CPU 12 determines the display attribute and display page of the image following the currently displayed image according to the selected mode. Then, the process returns to S140, in which the CPU 12 displays the image on the panel 22 according to the determined display attribute and display page.

For example, if the conjunct mode is selected, and if on the panel 22 there is displayed the last page of the image data of the cover in the document data set of the volume number "3", then the manipulation of the forward page-turning button 124 leads the panel 22 to display the first page of the image data of the table of contents in the document data set of the volume number "1" (see FIG. 5A). Further, for example, if the separate mode is selected, and if on the panel 22 there is displayed the last page of the image data of the body text in the document data set of the volume number "1", then the manipulation of the forward page-turning button 124 leads the panel 22 to display the first page of the image data of the cover in the document data set of the volume number "2" (see FIG. 5B). Further, for example, if the body text mode is selected, and if on the panel 22 there is displayed the last page of the image data of the body text in the document data set of the volume number "2", then the manipulation of the forward page-turning button 124 leads the panel 22 to display the first page of the image data of the body text in the document data set of the volume number "3" (see FIG. 5C).

On the other hand, if the forward page-turning button 124 is not manipulated (S142: No), then the process proceeds to S146. In S146, the CPU 12 determines whether or not the backward page-turning button 122 is manipulated. If the backward page-turning button 122 is manipulated (S146: Yes), then the process proceeds to S148. In S148, the CPU 12 determines the display attribute and display page of the image preceding the currently displayed image according to the selected mode. Then, the process returns to S140, in which the CPU 12 displays the image on the panel 22 according to the determined display attribute and display page.

For example, if the conjunct mode is selected, and if on the panel 22 there is displayed the first page of the image data of the table of contents in the document data set of the volume number "3", then the manipulation of the backward page-turning button 122 leads the panel 22 to display the last page of the image data of the table of contents in the document data set of the volume number "2" (see FIG. 5A). Further, for example, if the separate mode is selected, and if on the panel 22 there is displayed the first page of the image data of the cover in the document data set of the volume number "3", then the manipulation of the backward page-turning button 122 leads the panel 22 to display the last page of the image data of the body text in the document data set of the volume number "2" (see FIG. 5B). Further, for example, if the body text mode is selected, and if on the panel 22 there is displayed the first page of the image data of the body text in the document data set of the volume number "3", then the manipulation of the backward page-turning button 122 leads the panel 22 to display the last page of the image data of the body text in the document data set of the volume number "2" (see FIG. 5C).

On the other hand, if the backward page-turning button 122 is not manipulated (S146: No), then the process proceeds to S150. In S150, the CPU 12 determines whether or not any page is designated. Incidentally, designation of a page is carried out by manipulating the page designation button 126 displayed on the panel 22. In particular, the manipulation of the page designation button 126 leads the panel 22 to display a page designation screen 128 shown in FIG. 7C. On the page designation screen 128, there are displayed an attribute selection box 130, a page input box 132, and an OK button 134.

The attribute selection box 130 is configured for selecting an attribute of the page to be designated, and manipulating the attribute selection box 130 leads to display of a list of attributes. That is, by manipulating the attribute selection box 130, three buttons (not shown) are displayed for respectively selecting the cover, table of contents, and body text. Then, one of these three buttons is manipulated to select an attribute of the page to be designated. The page input box 132 is configured for inputting a page number of the page to be designated. The OK button 134 is a button to be manipulated after finishing the input on the page designation screen 128, and manipulating the OK button 134 leads to designating the page.

If a page is designated (S150: Yes), then the process proceeds to S152. In S152, the CPU 12 determines the display attribute and display page of the designated page. Then, the process returns to S140, in which the CPU 12 displays the image on the panel 22 according to the determined display attribute and display page.

[Effects]

In the cellular phone 10 according to the first embodiment, image data are acquired in such a state as sectioned according to each of a plurality of attributes, namely, the cover, table of contents and body text which constitute a document. Then, according to each attribute, page numbers are assigned to the image data sectioned by each attribute (S104, S110, and S116). By virtue of this, as will be explained later in detail, it is possible to display images based on the attributes.

Further, when acquiring an image data, it is possible to acquire information of the document (S120). By virtue of this, using the acquired information of the document, it is possible to sequence a plurality of consecutive documents and display the same.

Further, in the cellular phone 10 according to the first embodiment, as shown in FIGS. 5A to 5C, three modes are provided as a method for page-turning manipulation of the images displayed on the panel 22. By virtue of this, a user is able to carry out the page-turning manipulation of the images displayed on the panel 22 according to any of the three modes, thereby improving the page-turning manipulability.

In particular, in the separate mode as shown in FIG. 5B, after the images of one document are displayed on the panel 22, the images of the next document are displayed on the panel 22. By virtue of this, the user is able to view a plurality of documents in the correct sequence. Especially, after the last attribute of one document, namely the image of the last page of the body text, is displayed on the panel 22, the first attribute of the next document, namely the image of the first page of the cover, is displayed on the panel 22. By virtue of this, the user is able to sequentially view each of the plurality of documents from the first page to the last page.

Further, in the conjunct mode and body text mode as shown in FIGS. 5A and 5C, after the image of one document with a specified attribute is displayed on the panel 22, the next image is displayed on the panel 22 based on the attribute. By virtue of this, it is possible to display the images on the panel 22 according to each attribute, and thus the user is able to view the images according to each attribute. In particular, in the conjunct mode as shown in FIG. 5A, after a specified attribute, e.g., an image of the table of contents of one document, is displayed on the panel 22, the specified attribute, i.e., an image of the table of contents of the next document, is displayed on the panel 22. By virtue of this, the user is able to view the images of all attributes in the correct sequence according to each attribute.

Further, in the body text mode as shown in FIG. 5C, after a specified attribute of one document, namely an image of the body text, is displayed on the panel 22, a specified attribute of the next document, namely an image of another body text, is displayed on the panel 22. By virtue of this, the user is able to view only the images of specified attributes in the correct sequence. Especially, after a specified attribute of one document, namely the image of the last page of a body text, is displayed on the panel 22, a specified attribute of the next document, namely the image of the first page of another body text, is displayed on the panel 22. By virtue of this, the user is able to sequentially view each image of the body texts of a plurality of documents from the first page to the last page.

Further, images are displayed on the panel 22 according to the page number assigned to each attribute (S140). By virtue of this, it is possible to appropriately carry out the display of the images based on the attributes.

Further, before displaying the images of a plurality of documents, the CPU 12 reads in the information of the plurality of documents (S131). By virtue of this, it is possible to sequence a plurality of consecutive documents and display the same.

Figure 7C:
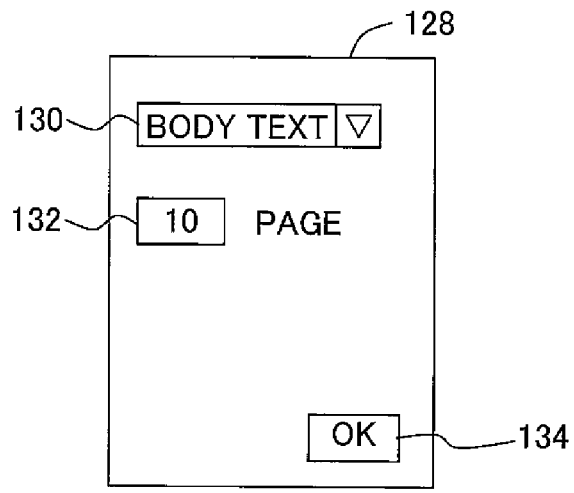

Further, it is possible to input an arbitrary page number on the page designation screen 128 shown in FIG. 7C, so as to display the image of an arbitrary page on the panel 22 (S152). By virtue of this, the user is able not only to view a document in the correct sequence but also to view the image of an arbitrary page.

A Second Embodiment

Next, an operation of the cellular phone 10 according to a second embodiment will be explained. Further, the configuration of the communication system 1 including the cellular phone 10 according to the second embodiment is the same as the configuration of the communication system 1 according to the first embodiment. Therefore, the explanation for the configuration is herein omitted.

The cellular phone 10 according to the second embodiment uses the scan application 32a to carry out a process for acquiring image data of a plurality of manuscripts read out or scanned by the scanner of the MFP 50. Further, the plurality of manuscripts constitute a document, which has five attributes, namely the cover, table of contents, body text, non body text, and afterword, while the image data are acquired according to each of these five attributes. Referring to FIG. 8, a flow will be explained in particular for acquiring the image data according to each of the five attributes. Further, the non body text is inserted before or after or between a plurality of manuscripts constituting the body text, to present advertisements, illustrations and the like which have no relation with the body text.

Figure 9:
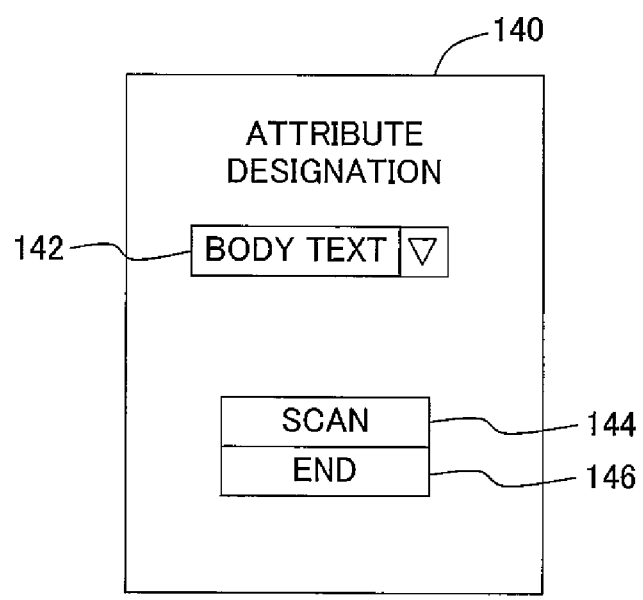
FIG. 9 shows a screen displayed on the panel by executing a scan application according to the second embodiment of the present invention.

In S160, the CPU 12 displays a scan instruction screen 140 shown in FIG. 9 on the panel 22. Then, the process proceeds to S162. The scan instruction screen 140 is configured for scanning manuscripts with various attributes, and an attribute designation box 142, a scan button 144 and an end button 146 are displayed thereon. The attribute designation box 142 is configured for designating an attribute as a scanning object, and manipulating the attribute designation box 142 leads to display of a list of attributes. That is, by manipulating the attribute designation box 142, five buttons (not shown) are displayed for respectively selecting the cover, table of contents, body text, non body text, and afterword. Then, one of these five buttons is manipulated to designate an attribute of the manuscript to be scanned. The scan button 144 is manipulated to scan the manuscript of the designated attribute. The end button 146 is manipulated after having scanned the manuscripts of all attributes.

In S162, the CPU 12 determines whether or not the end button 146 is pressed down. If the end button 146 is not pressed down (S162: No), then the process proceeds to S164. In S164, the CPU 12 determines whether or not the scan button 144 is pressed down. If the scan button 144 is not pressed down (S164: No), then the process returns to S162.

On the other hand, if the scan button 144 is pressed down (S164: Yes), then the process proceeds to S166. In S166, the CPU 12 sends, to the MFP 50, a scan processing command for acquiring the image data with the attribute designated on the scan instruction screen 140. On accepting the scan processing command, the MFP 50 scans the manuscript set on the platen to generate an image data of the manuscript. Then, the process proceeds to S168.

In S168, the CPU 12 acquires the image data of the manuscript from the MFP 50, and lets the image file storage area 14a store the acquired image data. On this occasion, the CPU 12 lets the image file storage area 14a store the image data associated with the page number, and the attribute information designated on the scan instruction screen 140. Then, the process returns to S162.

If the end button 146 is pressed down (S162: Yes), then the process proceeds to S170. In S170, the CPU 12 displays the document information input screen 104 shown in FIG. 3B. Then, the process proceeds to S172. Further, because the document information input screen 104 is the same as that of the first embodiment, its explanation is omitted.

In S172, the CPU 12 lets the image file storage area 14a store the document information inputted to the document information input screen 104. By virtue of this, from one document, the image data are acquired in such a state as sectioned according to each of the plurality of attributes, and these plurality of image data are stored along with the document information from which the plurality of image data are derived.

[Effects]

Figure 10:
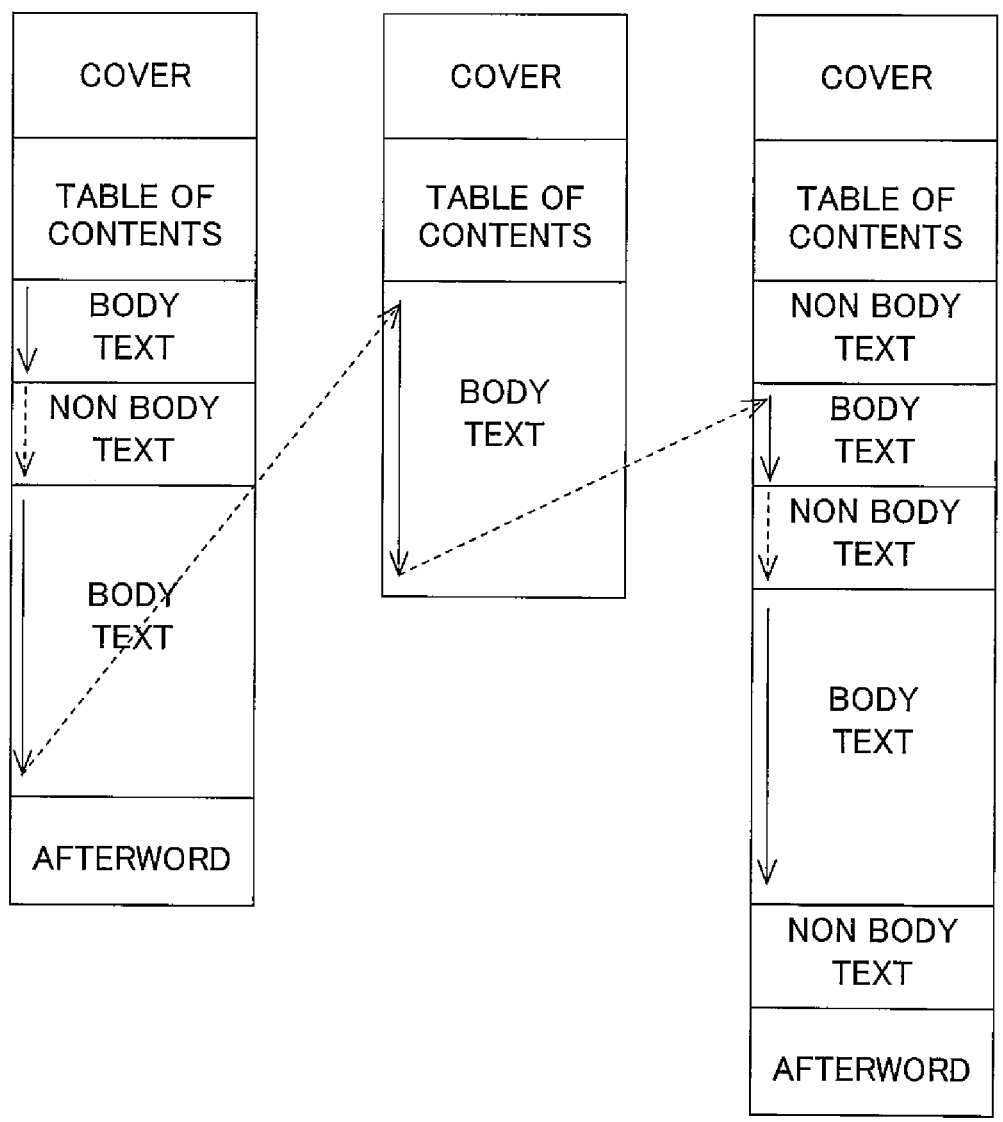
FIG. 10 conceptually shows a display method for displaying an image data on the panel in the second embodiment of the present invention.

In the cellular phone 10 according to the second embodiment, a plurality of image data are acquired in such a state as sectioned according to each of the five attributes, namely, the cover, table of contents, body text, non body text and afterword which are possessed by a document. Then, according to each attribute, page numbers are assigned to the plurality of image data sectioned by each of the plurality of attributes (S168). By virtue of this, like the cellular phone 10 according to the first embodiment, it is possible to display images based on the attributes. As shown in FIG. 10 for example, an explanation will be made for the case of displaying three consecutive documents on the panel 22 in the body text mode. Further, a non body text is inserted inside the body text of the first document, while other non body texts are inserted before, after and inside the body text of the third document.

In the body text mode, the image data of the body text in the first document data set are displayed sequentially according to the page sequence in the first image data set of the body text. On this occasion, because the image data set of the non body text is distinguished from the image data set of the body text, the image data of the non body text are not displayed. By virtue of this, the images are displayed sequentially from the first page to the last page of the image data set of the body text of the first document data set. Then, following the last page in the image data set of the body text of the first document data set, the images are displayed sequentially from the first page to the last page of the image data set of the body text of the second document data set. Then, following the last page in the image data set of the body text of the second document data set, the image data of the body text in the third document data set are displayed sequentially according to the page sequence in the third image data set of the body text. When the third document is displayed, like the first document, the image data of the non body texts are not displayed either, and the images are displayed sequentially from the first page to the last page of the image data set of the body text of the third document data set. In this manner, even for a document with non body texts inserted before, after and/or inside the body text, it is still possible to display only the body text on the panel 22 in the correct sequence.

[Modifications]

In the above embodiments, the viewer application 32b is used to display, on the panel 22, the image data of the images which are acquired from the MFP 50. However, it is possible to acquire the image data by various methods. For example, it is possible to adopt either a method of acquiring the image data from a nonvolatile memory installed in an unshown memory slot of the cellular phone 10, or a method of acquiring the image data from the web server 82.

Further, the apparatus, which is capable of displaying images based on image data and changing the displayed images based on the page-turning manipulation, is not limited to the cellular phone 10. For example, it may also be a notebook PC, a tablet device, etc.

Further, the attributes constituting a document are not limited to the cover, table of contents, body text, non body text and afterword, but can also adopt various other items. For example, it is possible to take any chapter in the body text as an attribute. That is, it is possible to take each chapter as an attribute, such as chapter one, chapter two, chapter three, etc. in the body text.

Further, in the above embodiments, the page-turning manipulation is carried out with the backward page-turning button 122 and forward page-turning button 124. However, the page-turning manipulation may also be carried out by way of flick manipulation, tilting the cellular phone 10, etc.

The cellular phone 10 of the above embodiments is explained with such a case that the CPU 12 executes the scan application 32a and viewer application 32b to carry out various processes. However, the present invention is not limited to this configuration. It may also be configured that the CPU 12, which executes the scan application 32a and viewer application 32b, issues instructions to the operating system 32c, other systems, and hardware constructions to carry out the various processes.

Further, the technical elements described in the present description and drawings are intended to exert technical usability individually or by way of various combinations, and thus are not limited to any combinations set forth in the appended claims for a patent application. Further, the techniques exemplified in the present description and drawings are intended to achieve a plurality of purposes at the same time, and to gain the technical usability by the achievement in itself of any one of those purposes.

The cellular phone 10 is an example of the output apparatus. The CPU 12 is an example of the computer. The image file storage area 14a is an example of the storage section. The panel 22 is an example of the output section. The scan application 32a and viewer application 32b are an example of the instructions which are stored in the storage medium and can be executed by the computer. The CPU 12 carrying out S104, S110 and S116 is an example of the data acquiring section and the steps of S104, S110 and S116 are an example of the data acquiring process. The step of S120 is an example of the data order acquiring process. The CPU 12 carrying out S144, S148 and S152 is an example of the controller. The step of S150 is an example of the page number input accepting process. The step of S131 is an example of the data order input accepting process. The image data is an example of the document data.

Further, each of the above programs may be configured from either one program module or a plurality of program modules. Further, each of the above examples may also be another replaceable configuration, within the scope of the present invention, either as a computer (the CPU 12) carrying out processes based on programs (the scan application 32a and viewer application 32b), or as a computer carrying out processes based on other programs than those of the above embodiments such as an operating system, other applications and programs, etc., or as a hardware construction (the panel 22 and the like) operating according to instructions of a computer, or as a configuration of a computer in cooperation with a hardware construction. Of course, it may also be either a computer carrying out processes by letting the processes in cooperation with one another based on a plurality of programs, or a hardware construction operating according to instructions of a computer carrying out processes by letting the processes in cooperation with one another based on a plurality of programs.

What is claimed is:

1. A non-transitory computer-readable medium storing computer-executable instructions that, when executed by a processor, cause an output apparatus, which includes a storage section configured to store a plurality of document data sets having a predetermined order and acquired from a plurality of documents, the plurality of document data sets each comprising image data and a plurality of attributes, wherein each of the plurality of attributes is associated with one or more sequential images of the image data, the attributes selected from the group consisting of a cover, a table of contents, body text, non-body text, and an afterward, the output apparatus further comprising an output section configured to output, on a display, images of the image data to perform:

a first output control process of controlling the output section to sequentially output, on the display, each image of image data belonging to one document data set and, thereafter, sequentially output, on the display, each image of image data belonging to a next document data set, wherein the next document data set is based on the predetermined order; and a second output control process of controlling the output section to sequentially output on the display, each image of the image data belonging to a specified attribute of one document data set and, thereafter, sequentially output, on the display, each image of the image data belonging to the specified attribute of the next document data set, each of the plurality of document data sets having a plurality of attributes including the specified attribute, and wherein the storage section is configured to store each of the plurality of document data sets in sections based on the plurality of attributes.

2. The medium according to claim 1, wherein in the second output control process, the output section outputs the image of the image data belonging to the specified attribute of the last document data set among the plurality of document data sets and, thereafter, outputs an image of a image data belonging to a next attribute following the specified attribute of the one document data set.

3. The medium according to claim 1, wherein the storage section is configured to store page numbers for each of the plurality of attributes, and in the first output control process and the second output control process, the output section outputs the images according to the page numbers.

4. The medium according to claim 3, wherein the instructions further cause the output apparatus to perform a page number input accepting process of accepting an input of an arbitrary page number among the page numbers, and in the first output control process and the second output control process, the output section outputs the image corresponding to the arbitrary page number accepted by the page number input accepting process.

5. The medium according to claim 3, wherein in the first output control process, the output section outputs an image of a last page of a last attribute of the one document data set among the plurality of document data sets and, thereafter, outputs an image of a first page of a first attribute of the next document data set.

6. The medium according to claim 3, wherein in the second output control process, the output section outputs an image of a last page of the specified attribute of the one document data set among the plurality of document data sets and, thereafter, outputs an image of a first page of the specified attribute of the next document data set.

7. The medium according to claim 1, wherein the instructions further cause the output apparatus to perform a data order input accepting process of accepting an input of the order of the plurality of image data.

8. An output apparatus comprising:
   a storage section configured to store a plurality of document data sets having a predetermined order and acquired from a plurality of documents, the document data sets each comprising image data and a plurality of attributes, wherein each of the plurality of attributes is associated with one or more sequential images of the image data, the attributes selected from the group consisting of a cover, a table of contents, body text, non-body text, and an afterward;
   an output section configured to output, on a display, images of image data;
   a controller configured to perform:
      a first output control process of controlling the output section to sequentially output, on the display, each image of image data belonging to one document data set and, thereafter, sequentially output, on the display, each image of image data belonging to a next document data set, wherein the next document data set is based on the predetermined order; and
      a second output control process of controlling the output section to sequentially output, on the display, each image of the image data belonging to a specified attribute of one document data set and, thereafter, sequentially output, on the display, each image of the image data belonging to the specified attribute of the next document data set, each of the plurality of document data sets having a plurality of attributes including the specified attribute, and
   wherein the storage section is configured to store each of the plurality of document data sets in sections based on the plurality of attributes.

9. The medium according to claim 1, wherein the instructions further cause the output apparatus to perform a data acquiring process of acquiring each of the plurality of document data sets in an order of the sections based on the plurality of attributes, and acquiring page numbers for each of the plurality of attributes.

10. The medium according to claim 9, wherein the instructions further cause the output apparatus to perform a data order acquiring process of acquiring a sequence of the plurality of document data sets.

11. The output apparatus according to claim 8, further comprising a data acquiring section configured to acquire each of the plurality of document data sets in an order of the sections based on the plurality of attributes and acquire page numbers for each of the plurality of attributes.

12. The medium according to claim 1, wherein one of the plurality of document data sets represents a book.

13. The output apparatus according to claim 8, wherein one of the plurality of document data sets represents a book.

* * * * *